Patented Feb. 15, 1944

2,341,850

UNITED STATES PATENT OFFICE 2,341,850

ORGANIC COMPOUND

Roger Adams, Urbana, Ill., assignor to E. I. du Pont de Nemours & Company, Wilmington, Del., a corporation of Delaware No Drawing. Original application July 27, 1940, Serial No. 348,072, now Patent No. 2,325,727, dated August 3, 1943. Divided and this application February 20, 1942, Serial No. 431,716

4 Claims. (Cl. 260—586)

This invention relates to the preparation of new and valuable organic compounds and more particularly to the preparation of new diaroylcyclohexenes which are valuable intermediates in the preparation of 1,3-diaryl-4,7-dihydroisobenzofurans. This application is a division of copending application Serial No. 348,072, filed July 27, 1940.

In U. S. P. 1,944,731 a specific application of the Diels-Alder reaction is disclosed wherein such compounds as butadiene or other unsaturated compounds containing conjugated double bonds are condensed with unsaturated ketones, acids, aldehydes, etc. to produce organic compounds having hydrogenated ring systems.

It is the object of this invention to prepare new organic compounds which can be readily converted to 1,3-diarylisobenzofurans which have been found to be valuable, particularly as fluorescent colors for hydrocarbon oils. It is a further object of the invention to prepare new organic compounds of the 1,3-diaryl-4,7-dihydroisobenzofuran series and the diaroylcyclohexenes which are employed in their preparation.

1,3-diphenylisobenzofuran of the formula

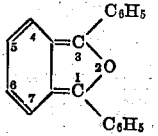

has been prepared in several ways which are, however, not of commercial interest because of the yields obtained. It has been found that the higher molecular weight 1,3-diarylisobenzofurans are of value as fluorescent colors for use in lubricating oils, but the methods heretofore disclosed for the preparation of the simple compounds of this class are not suitable for commercial production of these new higher molecular weight compounds.

I have found that the 1,3-diaryl-4,7-dihydroisobenzofurans of the formula

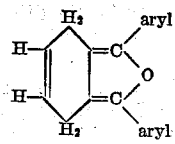

which can be readily and economically converted to the 1,3-diaryl-isobenzofurans, may be produced by the addition of butadiene or its substitution derivatives and 1,2-diaroylethylenes to give diaroylcyclohexenes, which in turn are converted by a simultaneous dehydration and furan ring-closure reaction to the 1,3-diaryl-4,7-dihydroisobenzofurans.

The condensation of the butadiene compounds with the diaroylethylene is effected by the Diels-Alder reaction by heating them together preferably in an organic solvent such as benzene, toluene, etc. Where the butadiene compound such as butadiene itself is a gas, the reaction is carried out under pressure. The resulting diaroylcyclohexenes are reacted with suitable dehydrating agents such as acetic anhydride in the presence of a small amount of a syrupy phosphoric acid or sulfuric acid to effect a simultaneous dehydration and ring-closure to the furan ring. Where substituted 1,3-diaryl-4,7-dihydroisobenzofurans are to be produced in which the substituents are in the partially hydrogenated benz-ring, substituted butadienes are employed. By using 1,4-disubstituted-butadienes in this synthesis, 4,7-disubstituted-dihydroisobenzofurans are obtained. In a similar manner by the use of 2,3-disubstituted-butadienes, 5,6-disubstituted 4,7-dihydroisobenzofurans are obtained. By employing various diaroylethylenes a large number of 1,3-diaryl-4,7-dihydro-isobenzofurans may be obtained.

The general process for preparing these new compounds may be illustrated as follows:

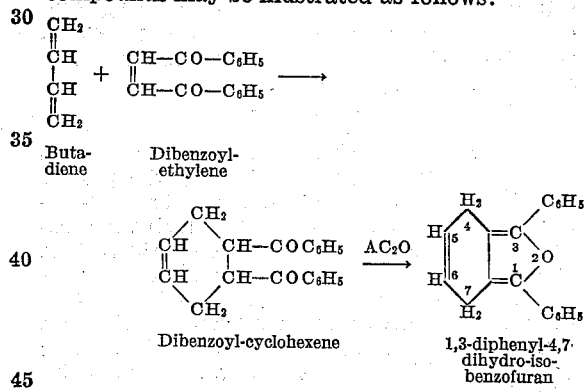

The various diaroylethylenes and substituted butadienes which may be used in this synthesis will be readily apparent and may be obtained by any of several known methods. The diaroylethylenes may be prepared, for instance, by the Friedel-Crafts reaction of fumaryl chloride upon aromatic hydrocarbons.

As examples of the butadienes which may be employed may be mentioned butadiene, 1,4-dimethylbutadiene, 2,3-dimethylbutadiene, and their higher homologues, the 1,4- and 2,3-diphenyl butadiene and their homologues.

The 1,2-diaroylethylenes which may be employed may be illustrated by dibenzoylethylene, ditolylethylene, dinaphthoylethylene, di-p-chlorobenzoylethylene, 1,2-trans-di-(p-xenoyl)-ethylene, etc. The invention also contemplates the use of the higher diaroylethylenes such as those which may be produced, for instance, by the Friedel-Crafts reaction of fumaryl chloride with higher molecular weight aromatic compounds such as anthracene, phenanthrene, etc.

The ring-closure reaction may be carried out with any suitable dehydration agents such as with acetic anhydride in the presence of a small amount of syrupy phosphoric acid or concentrated phosphoric acid, or with acetyl chloride and concentrated sulfuric acid, or similar dehydrating agents.

The following examples are given to illustrate the preparation of these now compounds. The parts used are by weight.

Example 1

A solution of 5 parts of butadiene in 175 parts of benzene is prepared by cooling the benzene and passing in butadiene gas until the desired amount is dissolved. Six parts of 1,2-trans-di-(p-xenoyl)-ethylene are then added and the mass is heated at 100° C. for 3 hours under pressure with constant agitation. Concentration of the resulting benzene solution gives the 4,5-di-(p-xenoyl)-cyclohexene-1,2- as a white crystalline product with a melting point of 267–268° C. (Cor.).

Example 2

A suspension of 6 parts of the 4,5-di-(p-xenoyl)-cyclohexene-1,2 in 270 parts of acetic anhydride is heated to reflux. As soon as the solvent begins to boil vigorously, a small amount of concentrated sulfuric acid is added. The suspended compound is immediately dissolved and the solution exhibits a characteristic fluorescence. Refluxing is continued for a short time and the solution is then cooled, whereupon the 1,3-di-(p-xenoyl)-4,7-dihydro-isobenzofuran separates out in fine yellow crystals. The product is removed by filtration and washed with methanol or recrystallized from benzene. It is obtained as fine yellow crystals having a melting point of 238–239° C. (Cor.). In organic solvents the 1,3-di-(p-xenoyl)-4,7-dihydroisobenzofuran dissolves with a yellow-green fluorescence.

Example 3

When 2,3-dimethylbutadiene is condensed with 1,2-trans-di-(p-xenoyl)-ethylene by the process described in Example 1, the 1,2-dimethyl-4,5-dixenoylcyclohexene is obtained which when recrystallized, has a melting point of 280–281° C. (Cor.). On subjecting this product to the process described in Example 2, the 1,3-di-(p-xenoyl)-5,6-dimethyl-4,7-dihydroisobenzofuran is obtained which after recrystallization from toluene is a yellow crystalline product having a melting point of 239–240° C. (Cor.).

Example 4

A mixture of 60 parts of 1,2-dibenzoylethylene, 41 parts of 1,4-dimethylbutadiene and 65 parts of toluene are heated under reflux for 18 hours. The solvent is then evaporated to concentrate the residue to a syrupy mass and while still hot 120 parts of methanol are added. On cooling the solution sets to a crystalline mass. It is then filtered with suction and washed with methanol. On recrystallization from a mixture of acetone and methanol the 3,6-dimethyl-4,5-dibenzoylcyclohexene-1,2 is obtained as a white product, having a melting point of 136–137° C. From the methanol mother liquor an isomeric adduct having a melting point of 86–88° C. may be obtained.

A solution of 10 parts of the 3,6-dimethyl-4,5-dibenzoylcyclohexene-1,2 in a mixture of 85 parts of glacial acetic acid and 43 parts of acetic anhydride and 0.5 part of 85% phosphoric acid are refluxed for 20 minutes. The solution is poured into water, extracted with chloroform and the solvent is removed under vacuum. The resulting mass is crystallized on slurrying with warm methanol. The 1,3-diphenyl-4,7-dimethyl 4,7-dihydroisobenzofuran on recrystallization from methanol is obtained in crystalline form with a melting point of 114–115° C.

Example 5

To a solution of 40 parts of trans-dibenzoylethylene in 160 parts of absolute ethanol are added 35 parts of crude 2,3-dimethylbutadiene (unredistilled dehydration product of pinacol with 48% hydrobromic acid). The mixture is refluxed for 3 hours and allowed to cool, whereupon the 1,2-dimethyl-4,5-dibenzoylcyclohexene crystallizes out. On recrystallization from 95% ethanol it is obtained in crystal form having a melting point of 111–111.5° C. (Cor.).

By subjecting the 1,2-dimethyl-4,5-dibenzoylcyclohexene to the dehydration ring-closure reaction as described in the previous example 1,3-diphenyl-5,6-dimethyl-4,7-dihydroisobenzofuran is obtained as yellowish-green fluorescent crystals having a melting point of 225–226° C. (Cor.). This product when dissolved in organic solvents, exhibits a blue fluorescence. In sulfuric acid it gives an orange brown color.

Example 6

To a cooled solution of 15 parts of butadiene in 175 parts of benzene are added 40 parts of trans-dibenzoylethylene. The mixture is heated under pressure for 2 hours at 100° C. The benzene is then evaporated to about one-half its volume and 100 parts of methanol are added. Upon cooling the 4,5-dibenzoyl-cyclohexene separates out. On recrystallization from ethanol it is obtained as white crystals having a melting point of 111.5–112° C. When the 4,5-dibenzoylcyclohexene is subjected to the dehydration ring-closure reaction as described in Example 4, the 1,3-diphenyl-4,7-dihydroisobenzofuran is obtained, which on recrystallization from petroleum ether is in the form of yellowish-green crystals having a melting point of 120–121° C. (Cor.).

In a similar manner to that described in the above examples 1,2-di-p-chlorobenzoylethylene may be condensed with butadiene to give the 4,5-di-p-chlorobenzoylcyclohexene having a melting point of 125° C. (Cor.). When subjected to the dehydration ring-closure reaction it gives the 1,3-di-p-chlorophenyl-4,7-dihydroisobenzofuran in the form of yellow needles having a melting point of 215° C.

1,2-di-p-toluylethylene when condensed with butadiene gives 4,5-di-p-toluylcyclohexene having a melting point of 127° C. which in turn may be converted to 1,3-di-p-tolyl-4,7-dihydroisobenzofuran having a melting point of 210° C.

Where 1,2-di-p-chlorobenzoylethylene is condensed with 2,3-dimethylbutadiene the 1,2-dimethyl-4,5-di-p-chlorobenzoyl-cyclohexene is obtained having a melting point of 151° C. which may be converted to the 1,3-di-p-chlorophenyl-5,6-dimethyl-4,7-dihydroisobenzofuran, having a melting point of 236° C.

Di-p-toluylethylene condensed with 2,3-dimethylbutadiene gives 1,2-dimethyl-4,5-di-p-toluylcyclohexene having a melting point of 129° C. which in turn may be converted to 1,3-di-p-tolyl-5,6-dimethyl-4,7-dihydroisobenzofuran having a melting point of 237° C.

Where 2,3-diphenylbutadiene is condensed with dibenzoylethylene the 1,2-diphenyl-4,5-dibenzoylcyclohexene is obtained, which when subjected to the dehydration ring-closure reaction is converted to 1,3,5,6-tetraphenyl-4,7-dihydroisobenzofuran which on recrystallization from toluene has a melting point of 272–274° C. The 2,3-diphenylbutadiene may be obtained by the method described by Allen et al. in the Journal of Canadian Research, February 1938.

By the substitution of other diaroylethylenes, particularly those containing aroyl groups of high molecular weight, a large variety of 1,3-diaryldihydroisobenzofurans may be obtained which are valuable as intermediates in the preparation of oil fluorescent colors.

I claim:
1. Diaryl substituted 4,5-dibenzoylcyclohexenes-1,2 which carry the two aryl groups in one of the pairs of positions 1,2 and p'-p''-positions on the benzoyl groups.
2. 4,5-di(p-xenoyl)-cyclohexene-1,2.
3. 1,2 - dimethyl-4,5-di-(p-xenoyl) - cyclohexene-1,2.
4. 1,2-diphenyl-4,5-dibenzoyl-cyclohexene.

ROGER ADAMS.